(12) United States Patent
Benthien et al.

(10) Patent No.: US 11,339,832 B2
(45) Date of Patent: May 24, 2022

(54) HOMOKINETIC JOINT

(71) Applicant: Airbus Operations GmbH, Hamburg (DE)

(72) Inventors: Hermann Benthien, Hamburg (DE); Andreas Poppe, Hamburg (DE)

(73) Assignee: Airbus Operations GmbH

( * ) Notice: Subject to any disclaimer, the term of this patent is extended or adjusted under 35 U.S.C. 154(b) by 607 days.

(21) Appl. No.: 16/398,737

(22) Filed: Apr. 30, 2019

(65) Prior Publication Data

US 2019/0345984 A1 Nov. 14, 2019

(30) Foreign Application Priority Data

May 8, 2018 (DE) ...................... 10 2018 207 130.6

(51) Int. Cl.
| | |
|---|---|
| F16D 13/34 | (2006.01) |
| F16D 3/34 | (2006.01) |
| F16D 3/224 | (2011.01) |
| F16C 11/06 | (2006.01) |

(52) U.S. Cl.
CPC ............ *F16D 3/34* (2013.01); *F16C 11/0652* (2013.01); *F16D 3/224* (2013.01)

(58) Field of Classification Search
CPC ..... Y10T 403/32647; Y10T 403/32655; Y10T 403/32672; F16C 11/06; F16D 3/34; F16D 3/44; F16D 3/224; F16D 3/223; Y10S 464/906
USPC ........................................................ 464/906
See application file for complete search history.

(56) References Cited

U.S. PATENT DOCUMENTS

| | | | | |
|---|---|---|---|---|
| 2,011,147 | A | * | 8/1935 | Haselau .................... F16D 3/34 464/104 |
| 5,115,725 | A | * | 5/1992 | Horiuchi ............. F02B 23/0672 92/157 |
| 10,260,569 | B2 | * | 4/2019 | Hirukawa ............... F16D 3/224 |
| 10,378,198 | B2 | * | 8/2019 | Benthien ................... E04B 1/19 |
| 2008/0261707 | A1 | | 10/2008 | Jacob et al. |

FOREIGN PATENT DOCUMENTS

| | | | |
|---|---|---|---|
| EP | 3135833 A1 | 3/2017 | |
| EP | 3252328 A1 | 12/2017 | |
| KR | 20110037493 A | * 4/2011 | ............. F16C 19/12 |
| WO | 2012039700 A1 | 3/2012 | |

* cited by examiner

*Primary Examiner* — Amber R Anderson
*Assistant Examiner* — David M Griffin
(74) *Attorney, Agent, or Firm* — Lerner, David, Littenberg, Krumholz & Mentlik, LLP (57) ABSTRACT

A homokinetic joint includes a joint socket shaft having a joint socket flange; a housing nut, which surrounds the joint socket shaft and has an internal thread; a joint head shaft, which has an external thread, wherein the external thread is of complementary design to the internal thread of the housing nut, wherein the joint socket shaft can be pivoted in a first pivoting direction and in a second pivoting direction relative to the joint head shaft; and a torsion disc between the joint socket shaft and the joint head shaft for transmitting torsional loads between the joint socket shaft and the joint head shaft; wherein a respective ball bearing is formed between the housing nut and the joint socket flange, between the joint socket flange and the torsion disc, and between the torsion disc and the joint head shaft.

19 Claims, 5 Drawing Sheets

HOMOKINETIC JOINT

FIELD OF THE INVENTION

The present invention relates to a homokinetic joint.

BACKGROUND OF THE INVENTION

Homokinetic joints, also referred to as constant velocity joints, are joints for the uniform transmission of angular velocities and/or torques from one shaft to a second shaft mounted at an angle to the latter, wherein the relative angle between the two shafts is variable. Joints of this kind are often not optimized or designed for the transmission of axial forces. Moreover, typical embodiments are often laborious to lubricate and seal.

Document EP 3 135 833 A1 describes a joint in which torques are transmitted between two shafts or rods that are pivotable relative to one another by means of grooved inter-engaging sliding surfaces. In this case, the joint is specifically designed as a ball joint, wherein a first rod is formed with a spherical-concave joint surface and a second rod is formed with a corresponding spherical-convex joint surface. In embodiments, the two rods are coupled to one another by way of a grooved disc situated in between, which is formed either with a convex or a concave contact surface on each side.

BRIEF SUMMARY OF THE INVENTION

Given this background situation, aspects of the present invention may provide flexible, simple and lightweight solutions for a homokinetic joint with reduced frictional resistance and improved load absorption.

Accordingly, a homokinetic joint is provided. The homokinetic joint comprises a joint socket shaft having a joint socket flange, which has an at least partially spherical-convex flange surface and an at least partially spherical-concave flange surface, wherein a flange guide track is arranged on the spherical-concave flange surface and is aligned in a first pivoting direction; a housing nut having an at least partially spherical-concave nut surface, which surrounds the joint socket shaft and has an internal thread; a joint head shaft, which has an at least partially spherical-convex head surface and an external thread, wherein the external thread is of complementary design to the internal thread of the housing nut, wherein a head guide track is arranged on the spherical-convex head surface and is aligned in a second pivoting direction, wherein the joint socket shaft can be pivoted in the first pivoting direction along the flange guide track and in the second pivoting direction along the head guide track relative to the joint head shaft; and a torsion disc having an at least partially spherical-convex disc surface, on which the joint socket flange is seated via the spherical-concave flange surface, and an at least partially spherical-concave disc surface, via which the torsion disc is seated on the spherical-convex head surface of the joint head shaft, wherein a first torsion disc guide track is arranged on the spherical-convex disc surface and is aligned in the first pivoting direction, wherein a second torsion disc guide track is arranged on the spherical-concave disc surface and is aligned in the second pivoting direction, wherein the flange guide track engages in the first torsion disc guide track, and the second torsion disc guide track engages in the head guide track in order to transmit torsional loads between the joint socket shaft and the joint head shaft; wherein a respective ball bearing is formed between the spherical-concave nut surface of the housing nut and the spherical-convex flange surface of the joint socket flange, between the spherical-concave flange surface of the joint socket flange and the spherical-convex disc surface of the torsion disc, and between the spherical-concave disc surface of the torsion disc and the spherical-convex head surface of the joint head shaft.

A concept underlying the present invention consists in equipping a homokinetic joint with a plurality of ball bearings, which each act in the manner of a ball bearing in order both to reduce the frictional resistance between the different joint surfaces and also to absorb and transmit different loads. One particular advantage of the solution according to the invention may be seen in the fact that both tension and compression loads as well as torsional loads are covered by the ball system. By virtue of the design, an upper ball bearing between the housing nut and the joint socket flange serves to absorb tension loads, i.e. tensile stress on the joint socket shaft relative to the housing nut with the joint shaft head secured thereon by means of the external thread. In addition to this, a central ball bearing and a lower ball bearing absorb torsional and compression loads between the joint socket flange of the joint socket shaft and the torsion disc and between the torsion disc and the joint head shaft. Similarly to a ball joint, a system comprising guide tracks or guide rails makes available two mutually independent pivoting directions, thus enabling the joint socket shaft to be tilted or pivoted in any direction relative to the joint head shaft, i.e. perpendicularly to an axial direction of the joint head shaft. Here, however, in contrast to a conventional ball joint, torsional rigidity, i.e. torsional stiffness, is achieved by means of the inter-engaging guide tracks, thus enabling torques or torsional moments to be transmitted between the two shafts.

Advantageous embodiments and developments will emerge from the description with reference to the figures.

According to a development, the spherical-convex flange surface can be formed with a multiplicity of first ball receptacles. In each first ball receptacle, a ball can be enclosed between the spherical-concave nut surface and the spherical-convex flange surface to form the ball bearing. In this case, the first ball receptacles serve as it were as ball tracks for the respective balls, which are in rolling friction with a spherical-convex flange surface, on the one hand, and with the spherical-concave nut surface, on the other. In this case, it is possible, in particular, for the first ball receptacles likewise to be of at least partially spherical-convex design, wherein the radius of curvature can correspond to that of the spherical-convex flange surface. Irrespective of the precise embodiment of the first ball receptacles, the radii of curvature of the spherical-concave nut surface and of the spherical-convex flange surface can likewise be matched to one another. The specific extent of the ball receptacles along the flange surface, which, in turn, predetermines the length of travel of the balls, and, more particularly in this case, the length thereof in the radial direction, can be chosen to match the desired deflection capability of the joint socket shaft relative to the joint head shaft.

According to a development, at least three first ball receptacles can be formed. In principle, stability in relation to tension loads can be achieved with just three ball receptacles since three load points can create a plane in which there is stability relative to tension and compression loads. However, it is furthermore likewise possible in principle for four or more ball receptacles to be formed.

According to a development, the first ball receptacles can be arranged around the joint socket flange at regular azimuthal intervals. In one specific example, four first ball receptacles are arranged around the joint socket flange at an angular spacing of 90° in each case.

According to a development, the spherical-concave flange surface and the spherical-convex disc surface can be formed with a multiplicity of second ball receptacles, which are each situated opposite one another in pairs. In each pair of second ball receptacles, a ball can be enclosed between the spherical-concave flange surface and the spherical-convex disc surface to form the ball bearing. Just like the first ball receptacles, the second ball receptacles serve as ball tracks for the respective balls, which in this case are in rolling friction with the spherical-concave flange surface, on the one hand, and with the spherical-convex disc surface, on the other.

According to a development, the spherical-concave disc surface and the spherical-convex head surface can be formed with a multiplicity of third ball receptacles, which are each situated opposite one another in pairs. In each pair of third ball receptacles, a ball can be enclosed between the spherical-concave disc surface and the spherical-convex head surface to form the ball bearing. Just like the first and/or second ball receptacles, the third ball receptacles serve as ball tracks for the respective balls, which in this case are in rolling friction with the spherical-concave disc surface, on the one hand, and with the spherical-convex head surface, on the other.

According to a development, at least four pairs of second ball receptacles and/or at least four pairs of third ball receptacles can be formed. In this case, two pairs of ball receptacles in each case can be designed to transmit torsional loads in a direction of rotation, while the other two pairs in each case can transmit torsional loads counter to the direction of rotation. In this case, the respective two pairs can be arranged opposite one another, laterally offset with respect to a central axis of the joint, i.e. the joint socket shaft, the torsion disc or the joint head shaft. The pairs of ball receptacles can be arranged symmetrically in azimuthal succession with respect to one another around a central axis of the joint.

According to a development, the pairs of second ball receptacles can each have a peripheral load transmission edge for transmitting torsional loads by means of the respective ball. According to a development, the pairs of third ball receptacles can each have a load transmission edge for transmitting torsional loads by means of the respective ball. In this advantageous development, the load transmission edges serve as it were as running surfaces for the respective balls. To enable loads to be transmitted efficiently, it is possible, in particular, for the load transmission edge to form a right angle.

According to a development, at least two pairs of second ball receptacles in each case can be designed for transmitting torsional loads in a direction of rotation and at least two pairs of second ball receptacles in each case can be designed for transmitting torsional loads counter to the direction of rotation. According to a development, at least two pairs of third ball receptacles in each case can be designed for transmitting torsional loads in a direction of rotation and at least two pairs of third ball receptacles in each case can be designed for transmitting torsional loads counter to the direction of rotation.

According to a development, the pairs of second ball receptacles and/or third ball receptacles can be arranged along the guide tracks. Guide track edges of the guide tracks can in each case be formed as load transmission edges. By way of example, a guide track can have a guide track edge on each side, along each of which at least two ball receptacles are arranged in series. In this case, the respective guide track edge as it were forms an outer boundary edge of the ball receptacle. To enable loads to be transmitted effectively, it is possible, in particular, for this boundary edge, i.e. the load transmission edge, to be of right-angled design.

According to a development, the joint socket flange and/or the joint head shaft can each be formed with a transverse hole for the passage of a lubricant in a radial direction. The joint socket flange, the torsion disc and/or the joint head shaft can each be formed with an axial hole for the passage of the lubricant. The axial holes and the transverse holes can interact to form a closed lubricant circuit through the homokinetic joint. The holes can interact so as to act as it were as a gravity pump, wherein the lubricant is sucked radially outward by centrifugal forces in the joint socket shaft when the shafts rotate, sinks there, flows inwards and then rises there.

According to a development, the housing nut has a nut hole on an opposite side of the internal thread. A diameter of the nut hole can be larger than a diameter of the joint socket shaft but smaller than a diameter of the joint socket flange.

According to a development, the nut hole can be sealed off by means of a bellows between the housing nut and the joint socket shaft.

According to a development, the curvature of the spherical-concave flange surface can correspond to the curvature of the spherical-convex disc surface. According to a development, the curvature of the spherical-concave disc surface can correspond to the curvature of the spherical-convex head surface.

According to a development, the first pivoting direction can be aligned perpendicularly to the second pivoting direction.

According to a development, the joint socket shaft, the torsion disc, the joint head shaft and/or the housing nut can be formed integrally. In particular, these components can be manufactured in an additive process. Despite their more or less complex geometry, the components of the homokinetic joint can thus be manufactured in a fully integral manner in a single process without the need for special expenditure, additional assembly steps or even manual work. Fundamentally, the homokinetic joint can be manufactured from all materials or material combinations for which additive methods are known. For example, the homokinetic joint can be formed from one or more plastics and/or one or more metal materials.

In the case of generative or additive manufacturing methods, also referred to generally as "3-D printing methods", one or more starting materials are layered one on top of the other in sequential layers and hardened, taking a digitized geometrical model of an object as a basis. Thus, in the case of selective laser melting (SLM), for example, a part is built up in layers from a modelling material, e.g. a plastic or a metal, by applying the modelling material in powder form to a substrate and liquefying it selectively by local laser radiation, resulting after cooling in a solid, coherent part. 3-D printing offers exceptional design freedom and, inter alia, allows the production at reasonable cost of objects which it would be possible to produce only at considerable cost, if at all, by conventional methods. For this reason, 3-D printing methods are currently widely used in industrial design, in the automotive industry, the aerospace industry or more generally in industrial product development, in which a resource-efficient process chain is used for small-scale and large-scale manufacture of customised parts to match requirements.

3-D printing methods are particularly advantageous in the present case since they allow the production of three-dimensional components in primary forming processes without the need for special manufacturing tools matched to the external shape of the components. As a result, highly efficient, material-saving and time-saving production processes for parts and components are made possible. 3-D printing methods of this kind are particularly advantageous in the aerospace sector since a large number of different parts matched to specific applications are used there, and these can be produced at low cost, with a shorter production lead time and with less complexity in the manufacturing systems required for production with such 3-D printing methods. 3-D printing methods in the sense according to the present application include all generative or additive manufacturing methods in which objects of a predefined shape are produced on the basis of geometric models from amorphous materials such as liquids and powders or neutrally shaped semifinished products such as material in strip or wire form by means of chemical and/or physical processes in a special generative manufacturing system. 3-D printing methods in the sense according to the present application here employ additive processes in which the starting material is built up sequentially in layers in predetermined shapes.

The above embodiments and developments can be combined in any desired manner, insofar as this is feasible. Further possible embodiments, developments and implementations of the invention also include combinations, not explicitly mentioned, of features of the invention that have been described above or are described below with reference to the illustrative embodiments. In this context, a person skilled in the art will, in particular, also add individual aspects as improvements or additions to the respective basic form of the present invention.

BRIEF DESCRIPTION OF THE DRAWINGS

The present invention is explained in greater detail below by means of the illustrative embodiments depicted in the schematic figures. Here.

DETAILED DESCRIPTION

The attached figures are intended to impart a greater understanding of the embodiments of the invention. They illustrate embodiments and, together with the description, serve to explain principles and concepts of the invention. Other embodiments and many of the advantages mentioned will become apparent from the drawings. The elements of the drawings are not necessarily shown to scale in relation to one another.

In the figures of the drawing, identical, functionally identical and identically acting elements, features and components are each provided with the same reference signs, unless explicitly stated otherwise.

Figure 1:
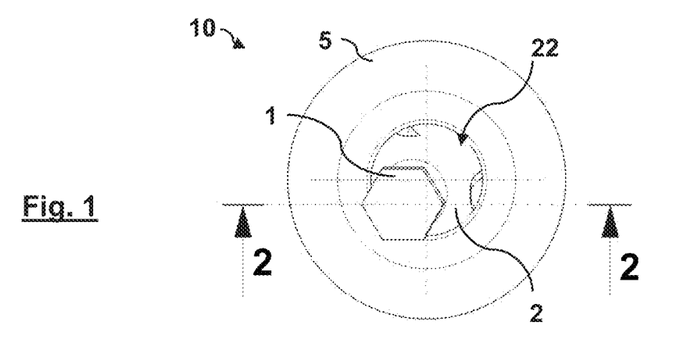
FIG. 1 shows a schematic plan view of a homokinetic joint according to one embodiment of the invention.
Figure 2:
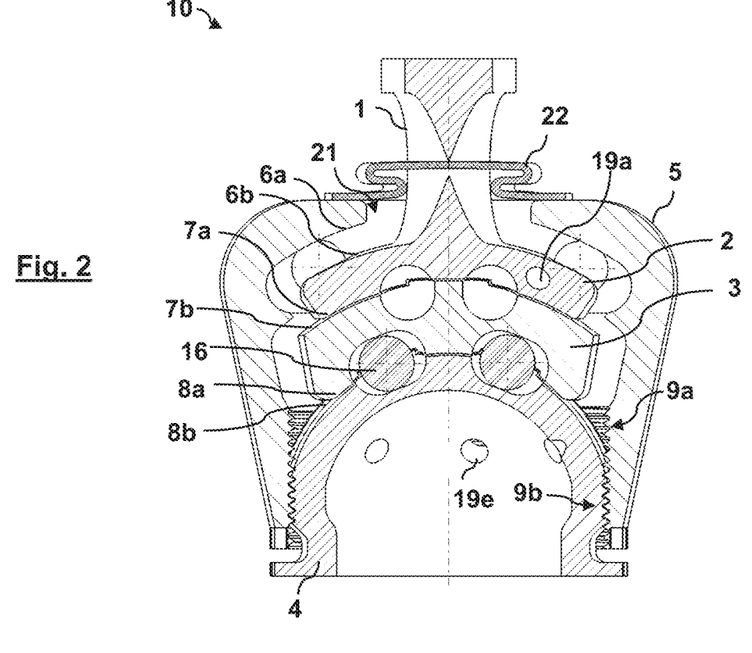
FIG. 2 shows a schematic side view in section of the homokinetic joint along the line 2-2 in FIG. 1.
Figure 3:
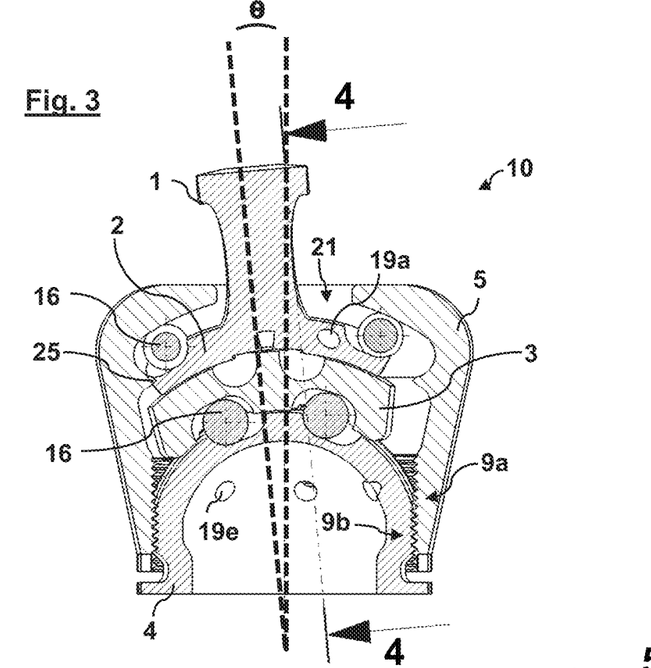
FIG. 3 shows a schematic side view in section of the homokinetic joint from FIG. 1 in a deflected state.
Figure 4:
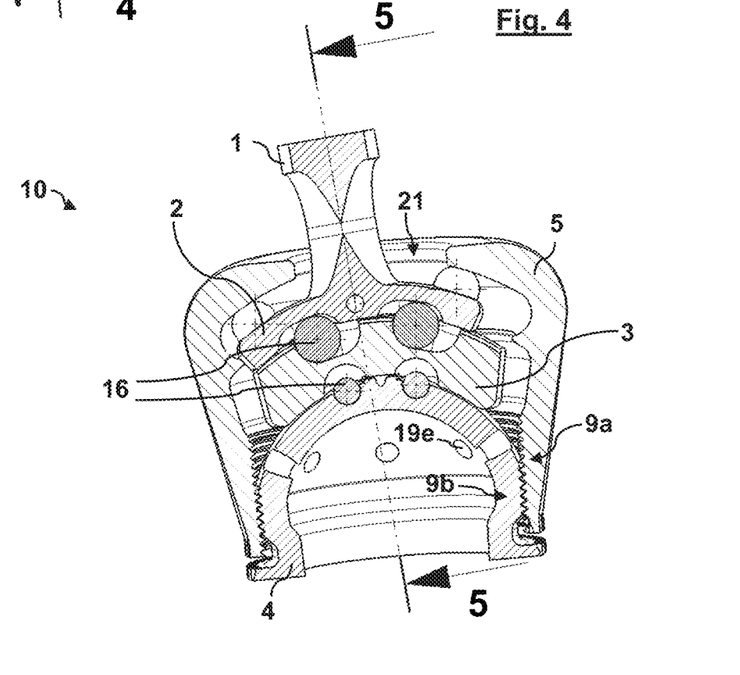
FIG. 4 shows a schematic side view in section of the homokinetic joint along the line 4-4 in FIG. 3.
Figure 5:
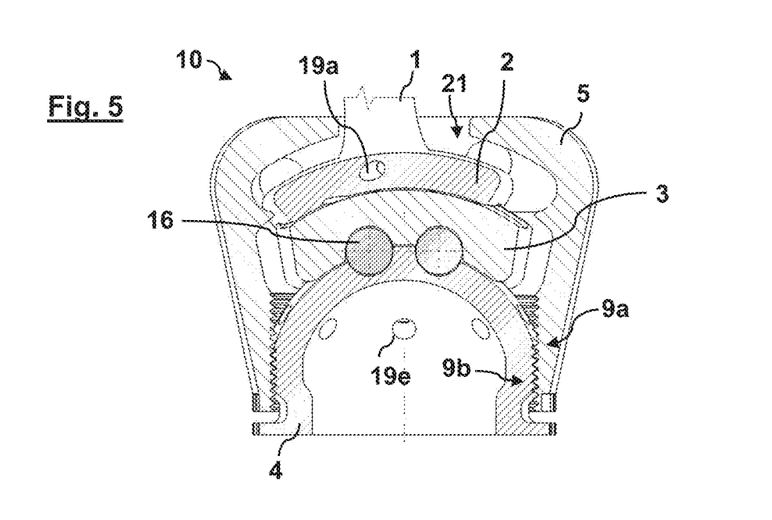
FIG. 5 shows a schematic side view in section of the homokinetic joint along the line 5-5 in FIG. 4.

FIG. 1 shows a schematic plan view of a homokinetic joint 10 according to one embodiment of the invention in a deflected state. FIG. 2 shows a schematic side view in section of the homokinetic joint 10 along the line A-A in FIG. 1, wherein the homokinetic joint 10 is not deflected in this illustration. Additional sectional views can be found in FIGS. 3 to 8. FIGS. 9 to 13 add supplementary perspective views of individual parts of the homokinetic joint 10.

The homokinetic joint 10 comprises a joint socket shaft 1 having a joint socket flange 2, a torsion disc 3, a joint head shaft 4 and a housing nut (cf. particularly FIG. 2 and FIGS. 9 to 13 for detail views of the components). The joint socket flange 2, the torsion disc 3 and the joint head shaft 4 interact to form a type of ball joint, wherein the joint socket flange 2 corresponds to a joint socket or ball socket and the joint head shaft 4 corresponds to a joint head. Here, the torsion disc 3 serves inter alia to provide rotationally fixed coupling of the joint socket flange 2 to the joint head shaft 4 for the transmission of rotary motions or rotary loads (torsional loads) between the two shafts 1, 4.

For this purpose, the joint socket flange 2 has an at least partially spherical-concave flange surface 7a, while the joint head shaft 4 is provided with an at least partially spherical-convex head surface 8b. The torsion disc 3 is correspondingly formed with an at least partially spherical-convex disc surface 7b and an at least partially spherical-concave disc surface 8a. The joint socket flange 2 rests by means of the spherical-concave flange surface 7a against the spherical-convex disc surface 7b. The torsion disc 3 then rests in turn, via the spherical-concave disc surface 8a, on the spherical-convex head surface 8b of the joint head shaft 4. In this arrangement, the curvature of the spherical-concave flange surface 7a corresponds to the curvature of the spherical-convex disc surface 7b, and the curvature of the spherical-concave disc surface 8a corresponds to the curvature of the spherical-convex head surface 8b.

Moreover, a flange guide track 11a (cf. especially FIG. 10), which is aligned in a first pivoting direction S1, is formed on the spherical-concave flange surface 7a. On the spherical-convex disc surface 7b, the torsion disc 3 has a first torsion disc guide track 11b, which is likewise aligned in the first pivoting direction S1 (cf. FIG. 11). The flange guide track 11a is shaped as a depression in the spherical-concave flange surface 7a. The first torsion disc guide track 11b is formed in a correspondingly complementary way as a raised portion on the spherical-convex disc surface 7b, thus enabling the first torsion disc guide track 11b to engage in the flange guide track 11a.

Moreover, a second torsion disc guide track 12a (cf. especially FIG. 12), which is aligned in a second pivoting direction S2, is furthermore formed on the spherical-concave disc surface 8a of the torsion disc 3. On the spherical-convex head surface 8b, the joint head shaft 4 has a head guide track 12b, which is likewise aligned in the second pivoting direction S2 (cf. FIG. 13). The second torsion disc guide track 12a is shaped as a depression in the spherical-concave disc surface 8a. The head guide track 12b is formed in a correspondingly complementary way as a raised portion on the spherical-convex head surface 8b, thus enabling the head guide track 12b to engage in the second torsion disc guide track 12a.

As a result, the joint socket shaft 1 can thus be pivoted in the first pivoting direction S1 along the flange guide track 11a and the first torsion disc guide track 11b and in the second pivoting direction S2 along the head guide track 12b and the second torsion disc guide track 12a, relative to the joint head shaft 4. Through a combination of both pivoting movements, pivoting or deflection of the joint socket shaft 1 in any direction relative to the joint head shaft 4 by a pivoting angle Θ is possible (cf. FIG. 3). The extent to which the joint socket shaft 1 can be deflected is determined decisively by the play available within the housing nut 5, i.e. the internal geometry thereof. Corresponding stop points or contact points 25 within the housing nut 5 predetermine a dedicated maximum deflection here. A contact point 25 of this kind is indicated by way of example in FIG. 3. At the same time, the interacting guide tracks 11a, 11b, 12a, 12b block rotation of the individual components relative to one another and thus make the homokinetic joint 10 torsionally stiff, thus enabling rotary movements or torsional loads to be transmitted between the two shafts 1, 4.

Here, the joint socket shaft 1 serves as a movable component, whereas the joint head shaft 4 is connected firmly to the housing nut 5 (cf. FIG. 2, for example). For this purpose, the housing nut 5 is formed with an internal thread 9a, which is of complementary design to an external thread 9b of the joint head shaft 4. The joint socket flange 2 is situated within the housing nut 5, wherein the joint socket shaft 1 projects through a nut hole 21 of the housing nut 5. The housing nut 5 is formed with an at least partially spherical-concave nut surface 6a, the curvature of which corresponds to the curvature of a spherical-convex flange surface 6b of the joint socket shaft 1. The nut hole 21 is situated on an opposite side of the housing nut 5 from the internal thread 9a, wherein a diameter of the nut hole 21 is larger than a diameter of the joint socket shaft 1 but smaller than a diameter of the joint socket flange 2. The joint socket flange 2 is thus enclosed within the housing nut 5. For assembly, the torsion disc 3 and the joint socket shaft 1 can be inserted into the housing nut 5 (from below in FIG. 2), and the joint head shaft 4 can then be screwed onto the housing nut 5. In order to simplify installation and general handling, the joint socket shaft 1 is provided with a screw structure 23. In the illustrative embodiment, this is a hexagonal profile. In principle, it will be clear to a person skilled in the art that the screw structure 23 can likewise have other geometries, e.g. a polygonal profile etc.

Figure 13:
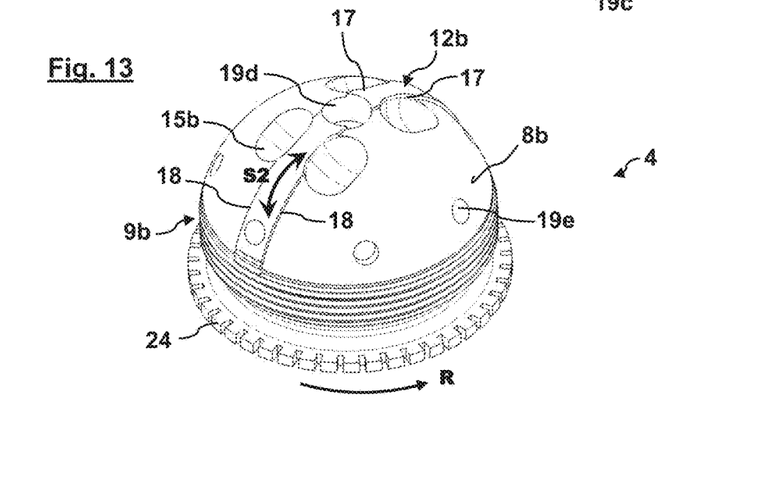
FIG. 13 shows a schematic perspective view obliquely from above of a joint head shaft from the homokinetic joint in FIG. 1.

In the embodiment shown, the nut hole 21 is sealed off between the housing nut 5 and the joint socket shaft 1 by a bellows 23, which can be manufactured from a flexible material such as rubber or the like, for example. To secure the connection between the housing nut 5 and the joint head shaft 4, a clip or the like (not depicted) can connect the two components to each other, e.g. by means of the fastening teeth 24 on the joint head shaft 4, which are shown in FIG. 13.

The homokinetic joint 10 is furthermore formed with a triple ball bearing or with three ball layers to improve load transmission and to minimize friction. In this case, a respective ball bearing is formed between the spherical-concave nut surface 6a of the housing nut 5 and the spherical-convex flange surface 6b of the joint socket flange 2, between the spherical-concave flange surface 7a of the joint socket flange 2 and the spherical-convex disc surface 7b of the torsion disc 3, and between the spherical-concave disc surface 8a of the torsion disc 3 and the spherical-convex head surface 8b of the joint head shaft 4. The configuration and operation of these ball layers is explained below with reference to FIG. 6 and FIGS. 9 to 13.

On the one hand, the spherical-convex flange surface 6b of the joint socket shaft 1 is formed with four oval first ball receptacles 13, wherein, in each first ball receptacle 13, a ball 16 is enclosed between the spherical-concave nut surface 6a and the spherical-convex flange surface 6b. The first ball receptacles 13 are arranged peripherally around the joint socket flange 2 at angular intervals of 90° in each case. In this arrangement, the balls 16 are in rolling friction both with the first ball receptacle 13 and hence with the spherical-convex flange surface 6b and with the spherical-concave nut surface 6a.

On the other hand, the spherical-concave flange surface 7a and the spherical-convex disc surface 7b are formed with four second ball receptacles 14a, 14b, which are each situated opposite one another in pairs, and the spherical-concave disc surface 8a and the spherical-convex head surface 8b are formed with four third ball receptacles 15a, 15b, which are each situated opposite one another in pairs (likewise having an oval geometry, cf. FIGS. 10 to 13). In each pair of second ball receptacles 14a, 14b, and third ball receptacles 15a, 15b, a ball 16 is enclosed, and these balls are likewise in rolling friction with the corresponding surfaces. In this case, the pairs of second ball receptacles 14a, 14b and third ball receptacles 15a, 15b are arranged along the guide tracks 11a, 11b, 12a, 12b, wherein guide track edges 18 of the guide tracks 11a, 11b, 12a, 12b each form an outer edge of the ball receptacles 14a, 14b, 15a, 15b. These outer edges serve as load transmission edges 17 for the transmission of torsional loads by means of the respective balls 16.

Figure 6:
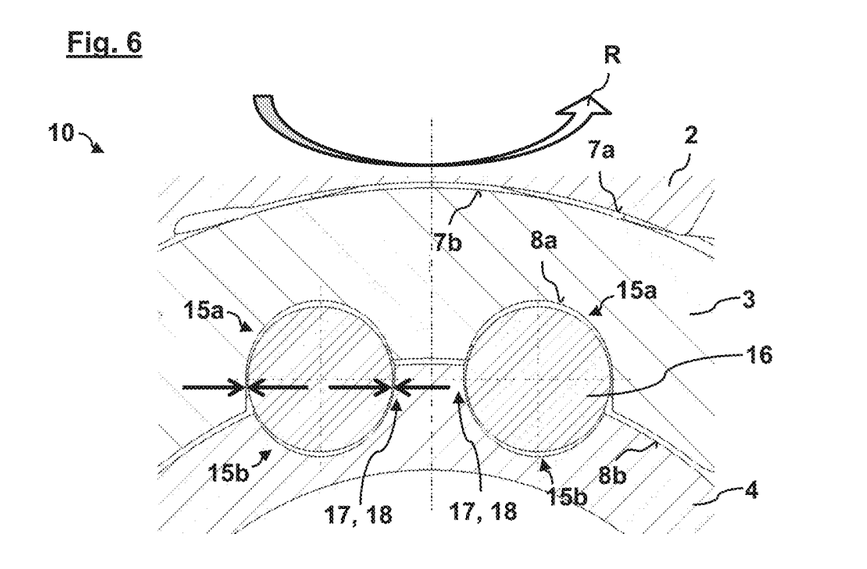
FIG. 6 shows a schematic detail view of FIG. 5.

In order to explain the functioning of this structure, FIG. 6 shows a detail view of two such pairs of ball receptacles 15a, 15b. As can be seen from the figure, the load transmission edges 17 are of substantially right-angled design. Owing to a rotation in direction of rotation R, the ball 16 in the left-hand half of the image is under load (indicated by arrows in FIG. 6) and, in this situation, transmits torsional loads via the load transmission edge 17 on the left in FIG. 6 from the torsion disc 3 (and ultimately from the joint socket shaft 1) to the joint head shaft 4. The right-angled design of the load transmission edge 17 enables effective load transmission here. On the other hand, the right-hand ball 16 in this example is not under load and can thus roll over the right-hand outer edge of the ball receptacle 15b (this is of significantly weaker and less steep design than the opposite load transmission edge 17). During a rotation counter to the direction of rotation R, the conditions are correspondingly reversed, and therefore in this case the right-hand ball 16 is under load. In total, just two balls 16 are depicted in the figure. On the basis of the other figures, it will be immediately clear to a person skilled in the art that the two other balls 16 of the ball receptacles 15a, 15b in each case are each subject to corresponding loads, i.e. a total of two balls in each case is under load in this plane during a rotation. The specific geometric configurations, shown here, of the ball receptacles 13, 14a, 14b, 15a, 15b should be taken as purely illustrative. For example, the track length or length of travel of the balls 16 in the ball receptacles 13, 14a, 14b, 15a, 15b can be appropriately optimized, depending on how far the joint socket shaft 1 is to be deflectable relative to the joint head shaft 4.

Figure 7:
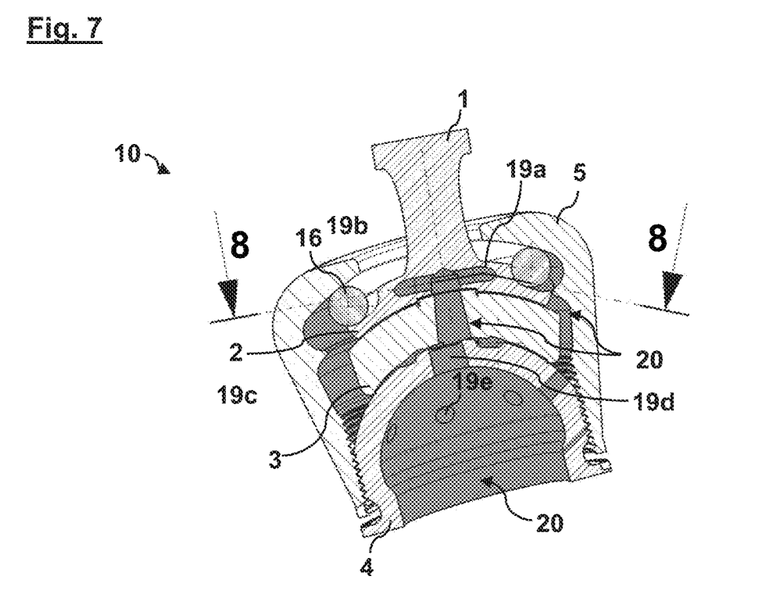
FIG. 7 shows a schematic side view in section of the homokinetic joint from FIG. 1 with a lubricant introduced.
Figure 8:
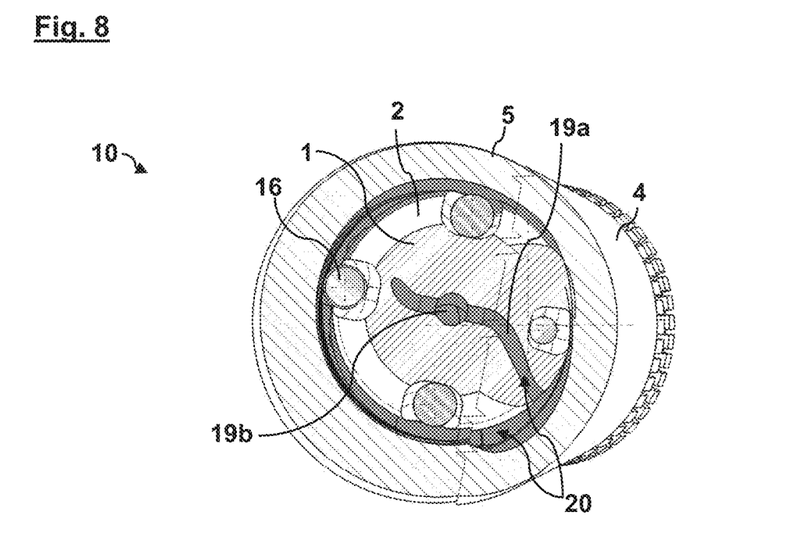
FIG. 8 shows a schematic section plan view of the homokinetic joint from along the line 8-8 in FIG. 7.
Figure 9:
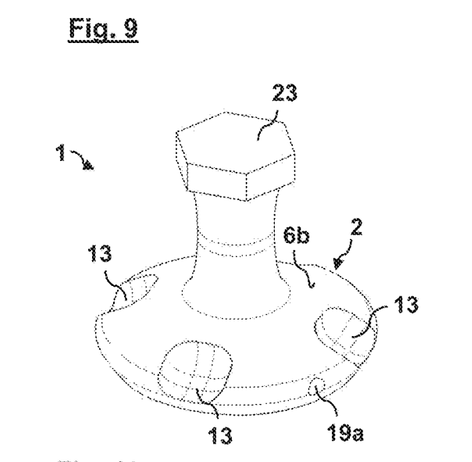
FIG. 9 shows a schematic perspective view obliquely from above of a joint socket shaft from the homokinetic joint in FIG. 1.
Figure 10:
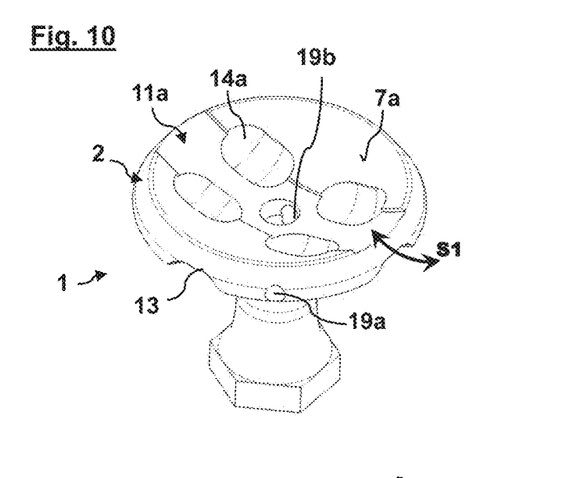
FIG. 10 shows a schematic perspective view obliquely from below of the joint socket shaft from FIG. 9.
Figure 11:
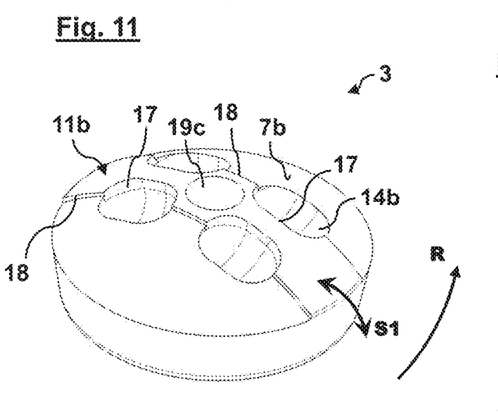
FIG. 11 shows a schematic perspective view obliquely from above of a torsion disc from the homokinetic joint in FIG. 1.
Figure 12:
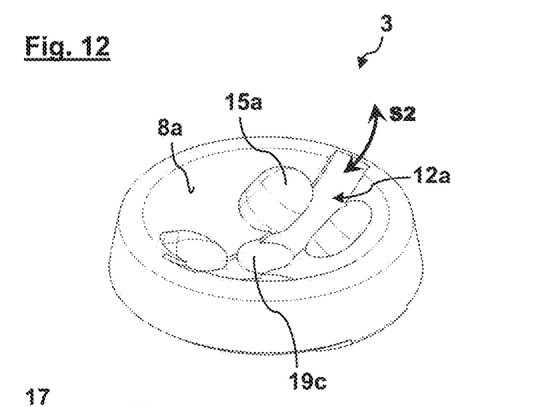
FIG. 12 shows a schematic perspective view obliquely from below of the torsion disc from FIG. 11.

The homokinetic joint 10 is furthermore equipped with a lubricant circuit similar to a gravity pump. This is illustrated in FIGS. 7 and 8, which shows the homokinetic joint 10 with lubricant 20 introduced. As can be seen from these and the other figures, both the joint socket flange 2 and the joint head shaft 4 are formed with a plurality of transverse holes 19a, 19e for the passage of the lubricant 20 in a radial direction. Moreover, not only the joint socket flange 2 but also the torsion disc 3 and the joint head shaft 4 each have axial holes 19b, 19c, 19d for the passage of the lubricant 20. These holes 19a-e and the free joint internal spaces interact to form a closed lubricant circuit through the homokinetic joint 10, in which lubricant 20 is sucked upwards by a vacuum and is sucked radially outwards there by the centrifugal forces. The lubricant 20 then falls downwards at the outside and flows back into an axial region of the joint 10 via the transverse hole 19e of the joint head shaft 4.

In the preceding detailed description, various features have been combined in one or more examples to improve the conciseness of the illustration. However, it should be clear here that the above description is of a merely illustrative and in no way restrictive nature. It serves to cover all the alternatives, modifications and equivalents of the various features and illustrative embodiments. Many other examples will be immediately and directly clear to a person skilled in the art from a consideration of the above description on the basis of their specialist knowledge.

The illustrative embodiments have been selected and described in order to explain as well as possible the principles underlying the invention and the possible applications thereof in practice. This will enable those skilled in the art to modify and use the invention and the various illustrative embodiments thereof in an optimum manner for the intended purpose. In the claims and in the description, the terms "including" and "having" are used as linguistically neutral concepts for the corresponding term "comprising". Furthermore, use of the terms "a" and "an" is not intended in principle to exclude a plurality of features and components described as such.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 joint socket shaft
2 joint socket flange
3 torsion disc
4 joint head shaft
5 housing nut
6a spherical-concave nut surface
6b spherical-convex flange surface
7a spherical-concave flange surface
7b spherical-convex disc surface
8a spherical-concave disc surface
8b spherical-convex head surface
9a internal thread
9b external thread
10 homokinetic joint
11a flange guide track
11b first torsion disc guide track
12a second torsion disc guide track
12b head guide track
13 first ball receptacle
14a upper second ball receptacle
14b lower second ball receptacle
15a upper third ball receptacle
15b lower third ball receptacle
16 ball
17 load transmission edge
18 guide track edge
19a transverse hole
19b axial hole
19c axial hole
19d axial hole
19e transverse hole
20 lubricant
21 nut hole
22 bellows
23 screw structure
24 fastening teeth
25 contact point
R direction of rotation
S1 first pivoting direction
S2 second pivoting direction
Θ pivoting angle

The invention claimed is:

1. A homokinetic joint comprising:
a joint socket shaft having a joint socket flange, the joint socket flange having an at least partially spherical-convex flange surface and an at least partially spherical-concave flange surface, wherein a flange guide track is arranged on the at least partially spherical-concave flange surface and is aligned in a first pivoting direction;
a housing nut having an at least partially spherical-concave nut surface surrounding the joint socket shaft and having an internal thread;
a joint head shaft having an at least partially spherical-convex head surface and an external thread, wherein the external thread is of complementary design to the internal thread of the housing nut, wherein a head guide track is arranged on the at least partially spherical-convex head surface and is aligned in a second pivoting direction, wherein the joint socket shaft is configured to be pivoted in the first pivoting direction along the flange guide track and in the second pivoting direction along the head guide track relative to the joint head shaft; and
a torsion disc having an at least partially spherical-convex disc surface, on which the joint socket flange is seated via the at least partially spherical-concave flange surface, and an at least partially spherical-concave disc surface, via which the torsion disc is seated on the at least partially spherical-convex head surface of the joint head shaft, wherein a first torsion disc guide track is arranged on the at least partially spherical-convex disc surface and is aligned in the first pivoting direction, wherein a second torsion disc guide track is arranged on the at least partially spherical-concave disc surface and is aligned in the second pivoting direction, wherein the flange guide track is configured to engage in the first torsion disc guide track, and the second torsion disc guide track is configured to be engage in the head guide track to transmit torsional loads between the joint socket shaft and the joint head shaft, wherein a respective ball bearing is formed between the at least partially spherical-concave nut surface of the housing nut and the at least partially spherical-convex flange surface of the joint socket flange, between the at least partially spherical-concave flange surface of the joint socket flange and the at least partially spherical-convex disc surface of the torsion disc, and between the at least partially spherical-concave disc surface of the torsion disc and the at least partially spherical-convex head surface of the joint head shaft, and wherein the at least partially spherical-convex flange surface is formed with a multiplicity of first ball receptacles, wherein, in each first ball receptacle, a ball is enclosed between the at least partially spherical-concave nut surface and the at least partially spherical-convex flange surface to form the ball bearing.

2. The joint according to claim 1, wherein the multiplicity of first ball receptacles comprises at least three first ball receptacles.

3. The joint according to claim 1, wherein the multiplicity of first ball receptacles is arranged around the joint socket flange at regular azimuthal intervals.

4. The joint according to claim 1, wherein the at least partially spherical-concave flange surface and the at least partially spherical-convex disc surface are formed with a multiplicity of second ball receptacles, which are each situated opposite one another in pairs, wherein, in each pair of second ball receptacles, a ball is enclosed between the at least partially spherical-concave flange surface and the at least partially spherical-convex disc surface to form the ball bearing, and/or wherein the at least partially spherical-concave disc surface and the at least partially spherical-convex head surface are formed with a multiplicity of third ball receptacles, which are each situated opposite one another in pairs, wherein, in each pair of third ball receptacles, a ball is enclosed between the at least partially spherical-concave disc surface and the at least partially spherical-convex head surface to form the ball bearing.

5. The joint according to claim 4, wherein the multiplicity of second ball receptacles comprises at least four pairs of second ball receptacles and/or wherein the multiplicity of third ball receptacles comprises at least four pairs of third ball receptacles.

6. The joint according to claim 4, wherein the pairs of second ball receptacles and/or third ball receptacles each have a peripheral load transmission edge for transmitting torsional loads by the respective ball.

7. The joint according to claim 4, wherein the load transmission edge is of right-angled design.

8. The joint according to claim 6, wherein at least two pairs of second ball receptacles of the multiplicity of second ball receptacles in each case are configured for transmitting torsional loads in a direction of rotation and at least two pairs of second ball receptacles of the multiplicity of second ball receptacles in each case are configured for transmitting torsional loads counter to the direction of rotation, and/or wherein at least two pairs of third ball receptacles of the multiplicity of third ball receptacles in each case are configured for transmitting torsional loads in a direction of rotation and at least two pairs of third ball receptacles of the multiplicity of third ball receptacles are configured for transmitting torsional loads counter to the direction of rotation.

9. The joint according to claim 7, wherein the pairs of second ball receptacles and/or third ball receptacles are arranged along the guide tracks and guide track edges of the guide tracks are in each case formed as load transmission edges.

10. The joint according to claim 1, wherein the joint socket flange and the joint head shaft are each formed with a transverse hole for the passage of a lubricant in a radial direction, wherein the joint socket flange, the torsion disc and the joint head shaft are each formed with an axial hole for the passage of the lubricant, wherein the axial holes and the transverse holes interact to form a closed lubricant circuit through the homokinetic joint.

11. The joint according to claim 1, wherein the housing nut has a nut hole on an opposite side of the internal thread, wherein a diameter of the nut hole is larger than a diameter of the joint socket shaft but smaller than a diameter of the joint socket flange.

12. The joint according to claim 11, wherein the nut hole is sealed off by a bellows between the housing nut and the joint socket shaft.

13. The joint according to claim 1, wherein the curvature of the at least partially spherical-concave flange surface corresponds to the curvature of the at least partially spherical-convex disc surface, and the curvature of the at least partially spherical-concave disc surface corresponds to the curvature of the at least partially spherical-convex head surface.

14. The joint according to claim 1, wherein the first pivoting direction is aligned perpendicularly to the second pivoting direction.

15. A homokinetic joint comprising:
a joint socket shaft having a joint socket flange, the joint socket flange having an at least partially spherical-convex flange surface and an at least partially spherical-concave flange surface, wherein a flange guide track is arranged on the at least partially spherical-concave flange surface and is aligned in a first pivoting direction;
a housing nut having an at least partially spherical-concave nut surface surrounding the joint socket shaft and having an internal thread;
a joint head shaft having an at least partially spherical-convex head surface and an external thread, wherein the external thread is of complementary design to the internal thread of the housing nut, wherein a head guide track is arranged on the at least partially spherical-convex head surface and is aligned in a second pivoting direction, wherein the joint socket shaft is configured to be pivoted in the first pivoting direction along the flange guide track and in the second pivoting direction along the head guide track relative to the joint head shaft; and
a torsion disc having an at least partially spherical-convex disc surface, on which the joint socket flange is seated via the at least partially spherical-concave flange surface, and an at least partially spherical-concave disc surface, via which the torsion disc is seated on the at least partially spherical-convex head surface of the joint head shaft, wherein a first torsion disc guide track is arranged on the at least partially spherical-convex disc surface and is aligned in the first pivoting direction, wherein a second torsion disc guide track is arranged on the at least partially spherical-concave disc surface and is aligned in the second pivoting direction, wherein the flange guide track is configured to engage in the first torsion disc guide track, and the second torsion disc guide track is configured to be engage in the head guide track to transmit torsional loads between the joint socket shaft and the joint head shaft, wherein a respective ball bearing is formed between the at least partially spherical-concave nut surface of the housing nut and the at least partially spherical-convex flange surface of the joint socket flange, between the at least partially spherical-concave flange surface of the joint socket flange and the at least partially spherical-convex disc surface of the torsion disc, and between the at least partially spherical-concave disc surface of the torsion disc and the at least partially spherical-convex head surface of the joint head shaft, and wherein the at least partially spherical-concave flange surface and the at least partially spherical-convex disc surface are formed with a multiplicity of second ball receptacles, which are each situated opposite one another in pairs, wherein, in each pair of second ball receptacles, a ball is enclosed between the at least partially spherical-concave flange surface and the at least partially spherical-convex disc surface to form the ball bearing, and/or wherein the at least partially spherical-concave disc surface and the at least partially spherical-convex head surface are formed with a multiplicity of third ball receptacles, which are each situated opposite one another in pairs, wherein, in each pair of third ball receptacles, a ball is enclosed between the at least partially spherical-concave disc surface and the at least partially spherical-convex head surface to form the ball bearing.

16. The joint according to claim 15, wherein the joint socket flange and the joint head shaft are each formed with a transverse hole for the passage of a lubricant in a radial direction, wherein the joint socket flange, the torsion disc and the joint head shaft are each formed with an axial hole for the passage of the lubricant, wherein the axial holes and the transverse holes interact to form a closed lubricant circuit through the homokinetic joint.

17. The joint according to claim 15, wherein the housing nut has a nut hole on an opposite side of the internal thread, wherein a diameter of the nut hole is larger than a diameter of the joint socket shaft but smaller than a diameter of the joint socket flange.

18. The joint according to claim 17, wherein the nut hole is sealed off by a bellows between the housing nut and the joint socket shaft.

19. The joint according to claim 15, wherein the curvature of the at least partially spherical-concave flange surface corresponds to the curvature of the at least partially spherical-convex disc surface, and the curvature of the at least partially spherical-concave disc surface corresponds to the curvature of the at least partially spherical-convex head surface.

* * * * *